United States Patent
Pyron

(10) Patent No.: US 8,096,325 B2
(45) Date of Patent: Jan. 17, 2012

(54) FASTENER FOR REMOVABLE SECUREMENT OF A CONDUIT BODY COVER

(75) Inventor: Roger Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 243 days.

(21) Appl. No.: 12/475,691

(22) Filed: Jun. 1, 2009

(65) Prior Publication Data

US 2010/0006170 A1   Jan. 14, 2010

Related U.S. Application Data

(60) Provisional application No. 61/079,464, filed on Jul. 10, 2008.

(51) Int. Cl.
  *F16L 55/10* (2006.01)

(52) U.S. Cl. ............ 138/92; 138/89; 411/106; 411/937; 285/179.1; 174/101; 220/327

(58) Field of Classification Search .................... 138/89, 138/92; 411/82, 106, 930, 937; 285/179.1; 174/101; 220/327
See application file for complete search history.

(56) References Cited

U.S. PATENT DOCUMENTS

| | | | | |
|---|---|---|---|---|
| 304,930 A * | 9/1884 | Herber | ............................ | 138/92 |
| 927,219 A * | 7/1909 | Burns | ........................ | 285/179.1 |
| 1,112,953 A * | 10/1914 | Webb | .......................... | 285/179.1 |
| 2,272,178 A * | 2/1942 | McDowell et al. | ........... | 220/305 |
| 2,544,522 A | 3/1951 | Bertelsen | | |
| 2,955,851 A * | 10/1960 | Scott | .......................... | 285/179.1 |
| 3,430,799 A * | 3/1969 | Maier | .......................... | 220/3.94 |
| 3,756,287 A * | 9/1973 | Bishop | ............................ | 138/92 |
| 4,398,649 A * | 8/1983 | Labbe | ............................ | 220/327 |
| 4,494,666 A * | 1/1985 | Cooper et al. | ................. | 220/582 |
| 4,818,476 A * | 4/1989 | Gasparro | ...................... | 376/294 |
| 5,222,851 A | 6/1993 | Dickerson | | |
| 5,584,626 A | 12/1996 | Assmundson | | |
| 5,647,710 A | 7/1997 | Cushman | | |
| 5,681,135 A | 10/1997 | Simonson | | |
| 5,749,670 A * | 5/1998 | Astor | ............................ | 403/269 |
| 5,857,816 A | 1/1999 | Assmundson | | |
| 6,069,317 A * | 5/2000 | Wagganer | ..................... | 174/650 |
| 7,504,580 B2 * | 3/2009 | Lammens et al. | .............. | 174/50 |
| 7,893,363 B2 * | 2/2011 | Pyron | ........................... | 174/481 |

* cited by examiner

*Primary Examiner* — James Hook
(74) *Attorney, Agent, or Firm* — Hoffmann & Baron, LLP

(57) ABSTRACT

The conduit body assembly includes a metallic conduit body having an open upper end and a metallic cover removably positionable over the upper end. A metallic threaded fastener secures the cover to the body. The metallic fastener includes a threaded post and a nut removably attached to one end of the post. The nut and the post are formed of similar non-corrosive materials so as to resist corrosion therebetween. The nut is removable from the post in an environment where corrosion between the metallic fastener and the conduit body and cover prevents removal of the threaded fastener therefrom. Removal of the nut from the threaded post permits removal of the cover from the conduit body.

7 Claims, 3 Drawing Sheets

FASTENER FOR REMOVABLE SECUREMENT OF A CONDUIT BODY COVER

CROSS-REFERENCE TO RELATED APPLICATION

This application claims priority to U.S. Provisional Patent Application No. 61/079,464 on Jul. 10, 2008, herein incorporated by reference.

FIELD OF THE INVENTION

The present invention relates generally to a conduit body assembly including a conduit body and a cover. More particularly, the present invention relates to a conduit body assembly including a fastener designed for removable securement of the cover to the body.

BACKGROUND OF THE INVENTION

Electrical conduit systems are required in order to safely provide electrical power to homes, commercial buildings and the like. These conduit systems often include long runs of rigid electrical conduits with frequent changes in direction such as 90° turns. Conduit bodies are often installed in conduit systems at various locations to provide access to wires in the conduits or to route wires through a bulk head, electrical equipment enclosure, junction box, or other electrical fixture. Conduit bodies typically have openings therethrough to allow passage of wire. Typically, wires are inserted through an opening on either a side or a bottom of the conduit body and are routed out through another opening located along another side of the conduit body. Typically, these openings are disposed at various angles to permit change in direction of the wire.

In order to access the conduit body to route the wires or to make connections or terminations to the wires contained therein, the upper end of the conduit body is typically opened providing such access. A cover may be removably positioned over the open end of the conduit body to enclose the conduit body and the wires therein for use. In order to permit subsequent access to the wires contained in the conduit body, a cover must be removably attached to the body.

In practice, many of the conduit body assemblies, including the cover and body, are formed a metallic material. Generally, the fasteners used to secure the cover to the body are also formed of metal. More typically, the metal used to form the fasteners is dissimilar from the metal used to formed the cover and conduit body. In use over time, the interface between the fastener and the conduit body and cover may con-ode or rust due to the dissimilar metals, as well as from environmental and atmospheric conditions, and such corrosion may result in the inability to readily remove the fastener. Continued attempts to remove the fastener could result in breakage of the fastener and/or stripping of the fastener aperture in the conduit body. This would require costly and time consuming retrofitting such as redrilling and retapping the aperture in the conduit body to accommodate another fastener to reclose the conduit body with the cover.

It is, therefore, desirable to provide an improved system of fastening the cover to the conduit body which allows for ease of disassembly.

SUMMARY OF THE INVENTION

The present invention provides a conduit body assembly. The assembly includes a metallic conduit body having an upper open end defined by a perimetrical lip. A metallic cover is removably positioned on a lip to cover the open end. The perimetrical lip includes an internally threaded cavity and a cover has an aperture therethrough aligned with the cavity. A metallic fastener is inserted through the cover aperture and threaded inserted into the threaded cavity of the body to secure the cover to the body. The fastener further includes an elongate threaded rod and an acorn nut removably attached to the threaded rod at one end thereof. The nut and the rod are formed of similar metallic material so as to resist corrosion therebetween.

BRIEF DESCRIPTION OF THE PREFERRED EMBODIMENT

The present invention provides a conduit body assembly including improved fasteners for removably securing a cover to a conduit body.

Figure 1:
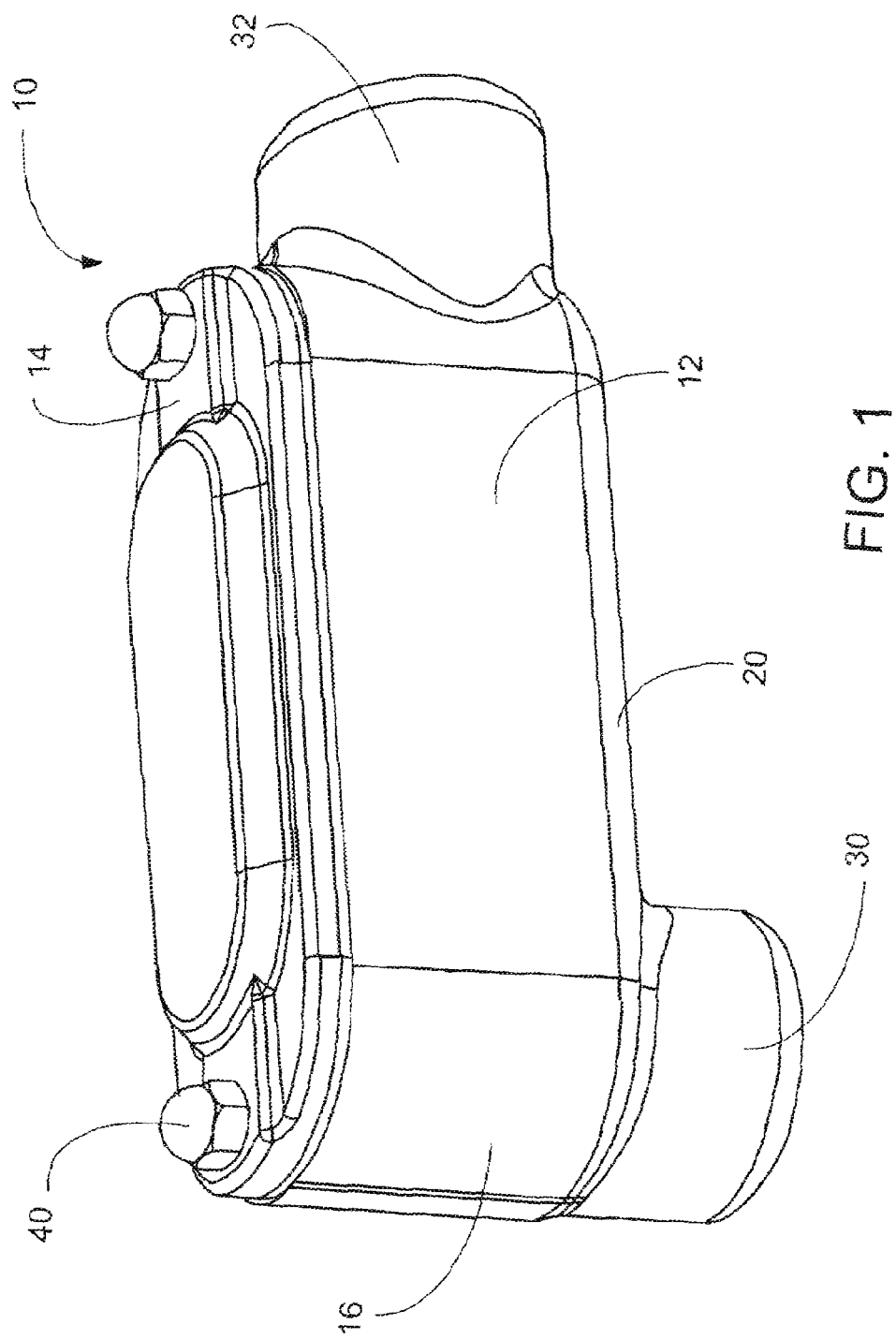
FIG. 1 is a perspective showing of the conduit body assembly of the present invention showing the cover fastened to the body.

Referring to FIG. 1, a conduit body assembly 10 in accordance with the present invention is shown. Conduit body assembly 10 includes a conduit body 12 and a cover 14 for attachment thereto. The conduit body and the cover may be of conventional construction and formed of a similar suitable metallic material such as cast iron.

Figure 2:
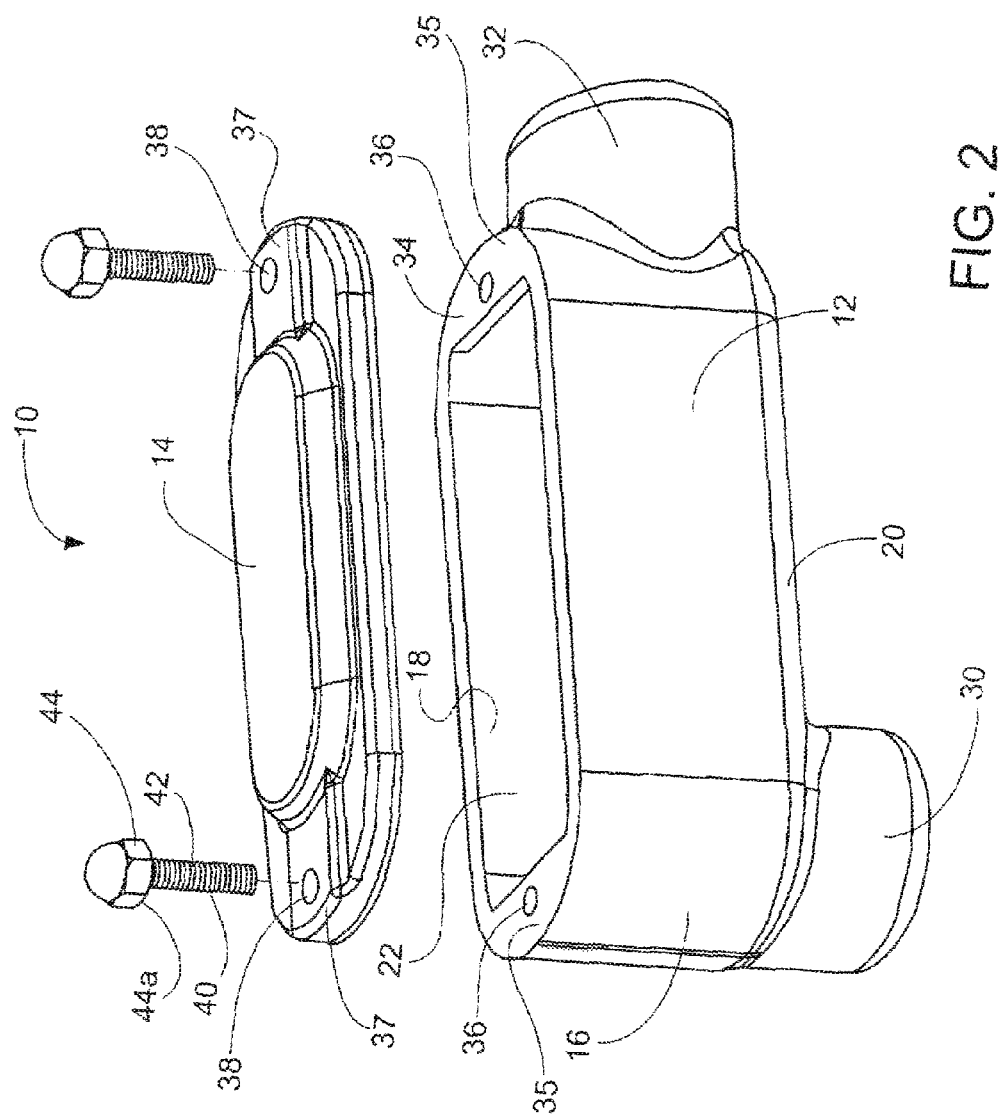
FIG. 2 is an exploded perspective view of the conduit body assembly of FIG. 1.

With reference additionally to FIG. 2, the conduit body is of the type known in the art having a generally elongate tubular shaped main body including an upwardly extending perimetrical side wall 16 having an open upper end 18 and a closed lower end 20. The side wall and the closed lower end 20 define a body interior 22. Cover 14 which is generally an elongate planar member may be positioned over open upper end 18 to enclose the interior 22 of conduit body 12.

Conduit body 12 further includes a pair of tubular projections or hubs 30 and 32 in communication with and extending outwardly from conduit body interior 22. The hubs 30 and 32 serve as points of attachment for conduits (not shown) so as to permit passage of electrical wire and cable through the conduit and into conduit body 12. The hubs 30 and 32 may vary in number and position with respect to the conduit body 12. In the present illustrative embodiment, hub 30 extends from lower wall 20 while hub 32 extends from side wall 16 so that the hubs are positioned at 90° with respect to one another. This arrangement allows a 90° change in direction of wires passed therethrough. Other angular orientations of the hubs with respect to the body are also contemplated.

Conduit body 12 defines a perimetrical rim 34 adjacent the open upper end 18. The perimetrical rim 34 is used to seat the cover 14 thereon. In that regard, the perimetrical rim 34 preferably includes a pair of internally threaded apertures 36 at opposite longitudinal ends 35 thereof. The apertures 36 are aligned with through holes 38 at the opposite longitudinal ends 37 of cover 14. When the cover 14 is properly positioned on the rim 34 of conduit body 12, the through holes 38 align with the threaded apertures 36 so as to accommodate fastening hardware to secure the cover 14 to the body 12.

Figure 3:
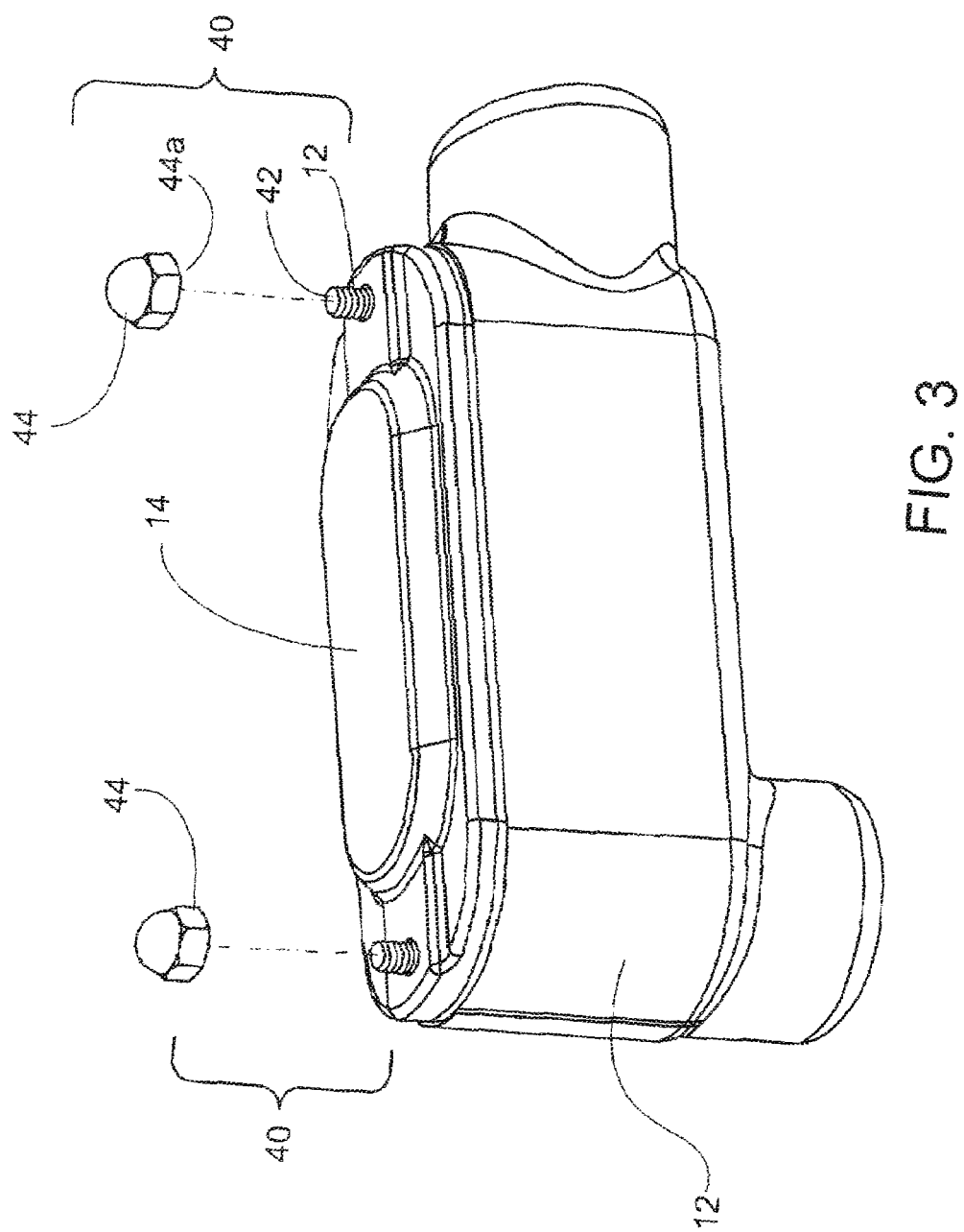
FIG. 3 is an exploded perspective view of the conduit body assembly of FIG. 1 with the cover shown placed on the conduit body.

Referring to FIGS. 2 and 3, the fasteners used to secure cover 14 to body 12 may now be described. Fastener 40 of the present invention is a two component member including an elongate post 42 and a separate nut 44. The post 42 and nut 44 are formed of a similar, non-corrosive metallic material. In the present illustrative embodiment, the post 42 and nut 44, which may be an acorn nut, are formed of stainless steel. The post 42 is an elongate externally threaded rod-like member which is designed for insertion through hole 38 of cover 14 and into threaded attachment with threaded aperture 36 of body 12.

The attachment of post 42 to acorn nut 44 is a threaded attachment as the undersurface 44a of acorn nut 44 includes an internally threaded bore (not shown) for receiving end 42a of post 42. The acorn nut 44 is designed to be attached to the end of post 42 in a manner which restricts the nut from being easily unthreaded from the post, yet permits removal therefrom if sufficient torque is applied. In the present illustrative embodiment, the attachment of the acorn nut to the post is done by staking. However, other attachment techniques such as patching, thread sealant, adhesive, as well as mismatched threads can be employed.

Forming of the acorn nut 44 and the post 42 of similar non-corrosive metallic material reduces the tendency for corrosion or rust buildup as may be occasioned by environmental or atmospheric conditions and/or use of dissimilar metals. Therefore, since the attachment of post 42 to acorn nut 44 is a corrosion resistant attachment, as will be described in further detail herein below, the acorn nut 44 remains detachably connected to the post 42. While fastener 40 comprising post 42 and acorn nut 44 are formed of similar material, in the preferred instance, stainless steel, it is not always the case that the fastener 40 and the conduit body 12 and cover 14 are formed of similar material. In the present illustrative embodiment, the conduit body 12 and the cover 14 may be preferably formed of cast iron. Thus, during use and in various adverse environments, the interface between the fastener 40 and the conduit body 12 and cover 14 may corrode or rust in part due to the dissimilarity of the materials.

When it is desirous to remove the cover 14 from the conduit body 12, the user typically removes the fastener 40 from the threaded aperture 36 of conduit body 12. However, any corrosive buildup between the fastener 40 and the conduit body 12 may result in the inability to readily remove the fastener therefrom. Continued efforts to remove the fastener 40 could result in stripping of the fastener 40 and/or the aperture in the conduit body 12 or breakage of the fastener 40 in the aperture. In either case, the conduit body 12 could be rendered useless or require costly reworking.

In the present instance, if the threaded post 42 can not be removed from the threaded aperture 36 of conduit body 12 clue to corrosion therebetween, once a sufficient torque is reached, continued application of removal force will result in the acorn nut 44 being removed from the post 42. This will enable removal of the cover 14 from conduit body 12. Since the post 42 and the acorn nut 44 are formed of similar non-corrosive metallic material, corrosion between the two components is unlikely.

It may be appreciated that, even with the fastener 40 of the present invention, if there is no corrosion between the post 42 and the threaded aperture 36, the fastener 40 can be removed in conventional fashion, as the acorn nut 44, while removable from post 42, is staked thereto to permit uniform removal of fastener 40 in absence of the detrimental effects of corrosion.

The following chart shows one example of the torque values required to remove the fastener.

| Angle of turn (Deg) | Clean Thread (inch-pounds) | Seized Thread (inch-pounds) |
|---|---|---|
| 5 | 25 | 29 |
| 10 | 18 | 22 |
| 15 | 9 | 17 |
| 20 | 3 | 12 |
| 30 | 1 | 11 |
| 60 | 1 | 10 |
| 90 | 1 | 10 |
| 180 | 1 | 10 |
| 270 | 1 | 10 |
| 360 | 1 | 10 |

The acorn nut is staked to the threaded post. As the acorn nut is turned, the initial coefficient of friction, due to the static state of the fastener, must be overcome. This accounts for the initial torque values at 5° and 10°. Once this static friction is overcome, the difference in torque values is relatively constant.

As an example, at 30° of turn, a clean thread (little or no corrosion) has a torque value of 1 inch-pound. Thus, torque applied in excess of that value will result in removal of the fastener from the threaded aperture. However, with a seized thread, the fastener will not readily turn. When the applied torque is in excess of 10 inch-pounds, the acorn nut will detach from the post preventing damage to the threaded aperture.

While the invention has been described in relationship to the preferred embodiments, it will be understood by those skilled in the art that various changes may be made without deviating from the fundamental nature and scope of the invention as defined in the appended claims.

What is claimed is:

1. A conduit body assembly comprising:
   a metallic conduit body having an upper open end defined by a perimetrical lip;
   a metallic cover removably positioned on said lip to cover said open end;
   said perimetrical lip having an internally threaded cavity and said cover having an aperture therethrough aligned with said cavity; and
   a metallic threaded fastener insertable through said cover aperture and threadedly inserted into said threaded cavity to secure said cover to said body, said metallic fastener and said metallic conduit body being formed of dissimilar materials thereby promoting corrosion between said fastener and threaded cavity, said fastener including:
   an elongate threaded post and a nut attached to said threaded post at one end thereof, said nut and post being formed of similar material so as to resist corrosion therebetween, said attachment of said nut to said post including a non-threaded attachment to resist unthreading of said nut from said post.

2. A conduit body assembly of claim 1 wherein said fastener is formed of stainless steel.

3. A conduit body assembly of claim 2 wherein said conduit body is formed of cast iron.

4. A conduit body assembly of claim 1 wherein said nut is an acorn nut.

5. A conduit body assembly of claim 1 wherein said non-threaded attachment includes said nut being staked to said post.

6. A conduit body assembly of claim 1 wherein said non-threaded attachment includes said nut being adhesively attached to said post.

7. A conduit body assembly of claim 1 wherein said perimetrical lip includes a pair of spaced apart internally threaded cavities and said cover includes a pair of said apertures there through in alignment with said cavities and further including a pair of said fasteners, said fasteners insertable through said cover apertures and threadably insertable into said threaded cavities.

* * * * *